(12) United States Patent
Tyrrell et al.

(10) Patent No.: US 8,213,792 B2
(45) Date of Patent: Jul. 3, 2012

(54) AUTOMATIC ONT SELF DISABLING SYSTEM, METHOD, AND COMPUTER READABLE MEDIUM

(75) Inventors: Raymond E. Tyrrell, Beaufort, NC (US); Collins Williams, Raleigh, NC (US); John P. Mathew, Raleigh, NC (US); David Hansen, Raleigh, NC (US)

(73) Assignee: Alcatel Lucent, Paris (FR)

( * ) Notice: Subject to any disclaimer, the term of this patent is extended or adjusted under 35 U.S.C. 154(b) by 688 days.

(21) Appl. No.: 11/940,377

(22) Filed: Nov. 15, 2007

(65) Prior Publication Data

US 2008/0138062 A1 Jun. 12, 2008

Related U.S. Application Data

(60) Provisional application No. 60/869,270, filed on Dec. 8, 2006.

(51) Int. Cl.
*H04B 10/08* (2006.01)
*H04J 14/00* (2006.01)

(52) U.S. Cl. .................................. 398/22; 398/2; 398/72
(58) Field of Classification Search .................. 398/2, 22
See application file for complete search history.

(56) References Cited

U.S. PATENT DOCUMENTS

| 6,225,938 | B1 * | 5/2001 | Hayes et al. | 341/176 |
| 2004/0208641 | A1 * | 10/2004 | Smeulders | 398/186 |
| 2008/0002718 | A1 * | 1/2008 | Bernard et al. | 370/395.51 |
| 2008/0056719 | A1 * | 3/2008 | Bernard et al. | 398/71 |

* cited by examiner

*Primary Examiner* — Nathan Curs
(74) *Attorney, Agent, or Firm* — RG & Associates

(57) ABSTRACT

A system, method and computer readable medium comprising instructions for sending a message from an Optical Network Terminal (ONT) to an Optical Line Terminal (OLT), if the ONT does not receive an expected OLT action or an expected OLT response to the message within a period, considering the non-receipt of the expected OLT action or the expected OLT response a failure, and if a certain number of consecutive failures have occurred, considering by the ONT that it has entered an uncontrolled state.

17 Claims, 5 Drawing Sheets

AUTOMATIC ONT SELF DISABLING SYSTEM, METHOD, AND COMPUTER READABLE MEDIUM

CLAIMING BENEFIT OF PRIOR FILED U.S. APPLICATION

This application claims the benefit of U.S. Provisional Application Ser. No. 60/869,270 filed on Dec. 8, 2006. The contents of this document are hereby incorporated by reference herein.

BACKGROUND OF THE INVENTION

1. Field of the Invention

The present invention is generally related to Optical Network Terminals (ONTs), and particularly to automatically controlling the ranging of an ONT with an optical signal present downstream of an Optical Line Terminal (OLT). The present invention allows the ONT to automatically disable itself if it fails to range with the optical signal present downstream of the OLT after a number of attempts.

2. Description of the Related Art

A passive optical network (PON) is a system that brings optical fiber cabling and signals all or most of the way to an end user. The term "passive" simply describes the fact that optical transmission has no power requirements or active electronic parts once the signal is going through the network.

A traditional PON consists of an OLT at a communication company's office and a number of Optical Network Terminals (ONTs) near end users. An ONT is a form of Access Node that converts optical signals transmitted via fiber to electrical signals that can be transmitted via coaxial cable or twisted pair of copper wiring to individual subscribers.

The OLT provides the interface between the PON and a number of ONTs typically connected in a star arrangement using optical splitters, which typically reside at a premise of a user. Multiple ONT units share a single upstream wavelength to communicate with the OLT at the head end. The OLT is responsible for allocating upstream bandwidth to the ONTs. Each ONT unit is assigned a specific time slot in which to communicate. ONTs are situated at varying distances from the OLT, meaning that the transmission delay from each ONT is unique. This presents an optical multi-point-to-point bus that is subject to corruption if an ONT unit transmits at any time other than during its assigned time slot or the transmitter is staying on. When this occurs, the ONT may disrupt the PON servicing other ONTs. ONTs are not controllable from the OLT and any untimely transmission from the ONT may result in optical collisions on the shared optical media located between the OLT and the splitter servicing the other ONTs thus resulting in a loss of service.

A further problem arises when an ONT suffers a loss of service during normal operation, due to a maintenance issue, power outage or other equipment/hardware problem. In order to resume the lost service, the ONT attempts to range back to the system by continuously sending handshake signals at random times to the OLT. This can easily result in an optical collision, and disruption of service to other ONTs on the system.

In an effort to overcome these deficiencies, there have been attempts to provide solutions to this problem by introducing various hardware components such as "watchdog timers" which can be reset. Such timers detect the excessive laser use by the ONTs and resets the normal laser enable control signal. If the control signal does not reset the watchdog timer, then the timer times out and inhibits the transmit laser from coming on. Other solutions attempt to detect when an ONT unit becomes disruptive and identify an uncontrolled unit by variation in power levels to the system. These levels are compared to the power levels associated with the normal operation. If the variation is noticed, all the ONTs are turned off and then turned on sequentially by providing and maintaining a time lag so the transmissions do not interfere with each other.

There is no known mechanism to allow ONTs to recognize that they are not synchronized with an allotted time slot. As such, they keep on transmitting and disrupting the transmission to other ONTs in the network. All the known solutions require a positive evidence of malfunction which require a hardware implementation. Such an implementation is costly and the solution that can be provided after such a cost is incurred is undesirable.

Therefore, a more reliable means of detection is required to prevent the disruption of a system by an uncontrolled ONT unit.

SUMMARY OF THE INVENTION

The present invention provides an automatic ONT self disabling system, method, and computer readable medium. In one embodiment, the invention encompasses a computer readable medium or software that requires no proof that a system is functioning correctly as the ONT can recognize the uncontrolled state after making a programmed number of attempts to range with an optical signal present downstream of the OLT. If the ONT fails to range, it automatically disables its transmit function and waits for a valid handshake signal to range back to the system.

The invention is drawn to a system, method, and computer readable medium which disciplines the ONT by commanding the ONT to stop transmitting on the PON if the ONT does not receive an explicit handshake message from the OLT thereby preventing the OLT from disrupting the PON system. In other embodiments, such a solution can be provided via firmware or hardware. In the present invention, ONTs are granted permission under the control of the OLT to transmit data packets upstream to the OLT on a shared PON only in a specific time slot assigned to each ONT unit.

Accordingly, it is an object of the invention to provide a system which does not require any human intervention or any proof that the system is working satisfactorily. Such a system automatically adjusts and resets itself compared to other systems which require positive evidence and a human intervention to evaluate and reset the system.

It is another object of the invention to analytically determine and validate empirically the appropriate range of the values for a set of parameters, such as time, duration and number of attempts to be used in the program for ranging with the optical signal present downstream of an OLT.

It is further object of the invention to modify the values of the parameters periodically and optimize them to the extent that the system runs more reliably. For example, when an ONT utilizing the present invention sends an ONT management and control interface (OMCI) message (or the handshake message), it is able to establish a handshake with the optical signal present downstream of the OLT with fewer attempts.

The present invention further includes, in some embodiments, an OLT that provokes a handshake with a detectable OMCI from the ONTs. The OLT also has an advantage of periodically sending handshake messages and provoking an explicit enable function. In order to take advantage of the periodic nature of the OLT, the ONT, utilizing the present invention, makes a specific number of attempts to range with the optical signal present downstream of the OLT. If the ONT fails to range, in a programmed number of attempts, the ONTs are programmed to wait for a short duration, send the OMCI message periodically and to receive an explicit enable from the OLT to provoke a handshake for the purpose of establishing or re-establishing a communication with the OLT.

In one embodiment of the present invention, a computer readable medium comprises instructions for: entering a first state if an optical signal is present and if a ranging process cannot occur: monitoring downstream traffic, disabling a transmit function, starting a first timer, and entering a second state if the first timer expires.

In another embodiment of the present invention, a method for disabling an Optical Network Terminal (ONT), comprises sending a message from the ONT to an Optical Line Terminal (OLT), if the ONT does not receive an expected OLT action or an expected OLT response to the message within a period, considering the non-receipt of the expected OLT action or the expected OLT response a failure, and if a certain number of consecutive failures have occurred, considering by the ONT that it has entered an uncontrolled state.

In a further embodiment of the present invention, a system for disabling an Optical Network Terminal (ONT), comprises at least one ONT, and an Optical Line Terminal (OLT) that receives a message from the ONT, wherein, if the ONT does not receive an expected OLT action or an expected OLT response to the message within a period, the ONT considers itself to have entered an uncontrolled state.

DETAILED DESCRIPTION OF THE INVENTION

Figure 1:
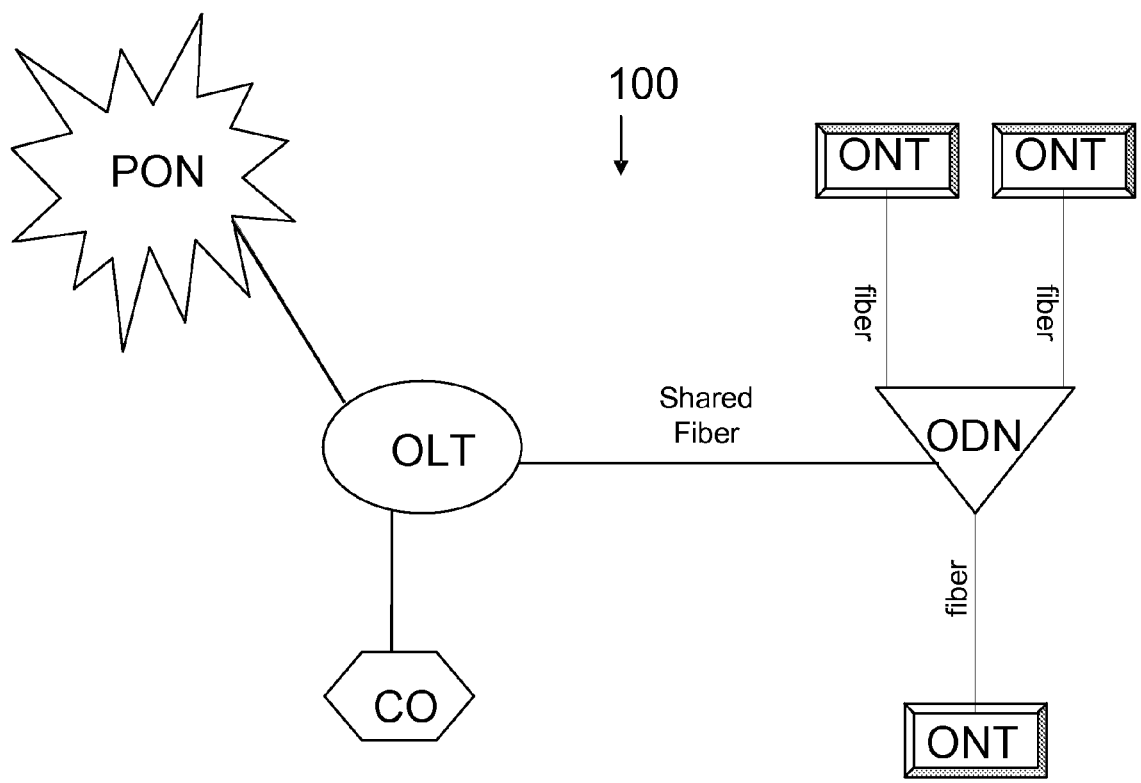
FIG. 1 illustrates a network according to an embodiment of the present invention.

Referring to FIG. 1, a block diagram 100 illustrating a PON system architecture of the present invention is depicted. The system 100 includes a PON located at a remote location that sends an optical signal to the OLT typically located at a service provider's Central Office. The OLT is connected to the ONTs through an optical splitter called an Optical Distribution Network (ODN). The ONTs are connected to the optical splitter in a star-like configuration which facilitates the OLT in maintaining a unique time slot for each ONT in the network. Each ONT is connected to the OLT through a fiber optic cable and each ONT in turn, is connected to end user equipment.

Figure 2:
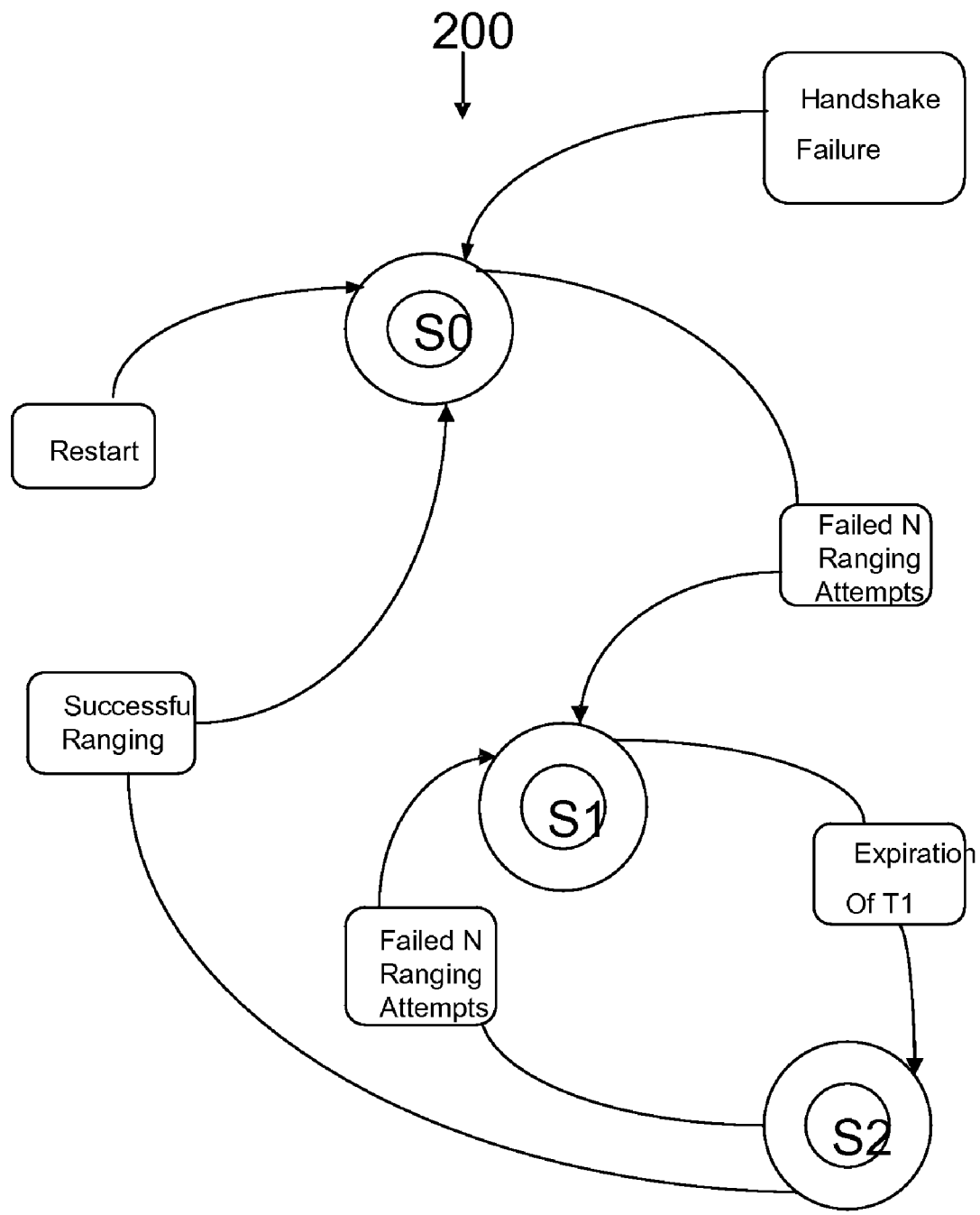
FIG. 2 illustrates a state diagram according to an embodiment of the present invention.

Now referring to FIG. 2, a state diagram 200 illustrating the stages of operation of one embodiment of the invention is depicted and includes various stages such as, state S0, state S1 and state S2. Depending on the particular state, the software of the present invention, which is preferably located on one or more ONTs, provides or permits a certain action to occur. State S0 has the same behavior as the ONT it currently resides on. If there is an optical signal present downstream of the OLT but the ONT fails to range within N attempts (ranging windows) it transitions into a state S1. The ranging process adjusts the timing for each ONT to compensate for the differential distance from the OLT to ONT. In state S1 the ONT disables the transmit function, starts a timer T1 and listens to the optical traffic downstream of the OLT and periodically sends an OMCI message to the OLT. If the ONT is able to revoke the explicit enable, it transitions to the state S0, attempts to establish the handshake with the OLT and ranges with the optical signal present downstream of the OLT. If the ONT is not able to revoke the explicit enable with the OLT within a time T1, it transitions to S2, enables the transmit function, again listens to the optical traffic downstream of the OLT and sends an OMCI message to the OLT. While the ONT is in state S2, on receiving the explicit enable from the OLT, it attempts to handshake with the OLT, transitions to S0 and ranges with the optical signal present downstream of the OLT. If the ONT while in state S2 is not able to range after N attempts, it transitions back to state S1, disables its transmit function and starts a timer T1', listens to the optical traffic downstream of the OLT and sends an OMCI message to the OLT for revoking an explicit enable, and attempts to range with the optical system.

Figure 3:
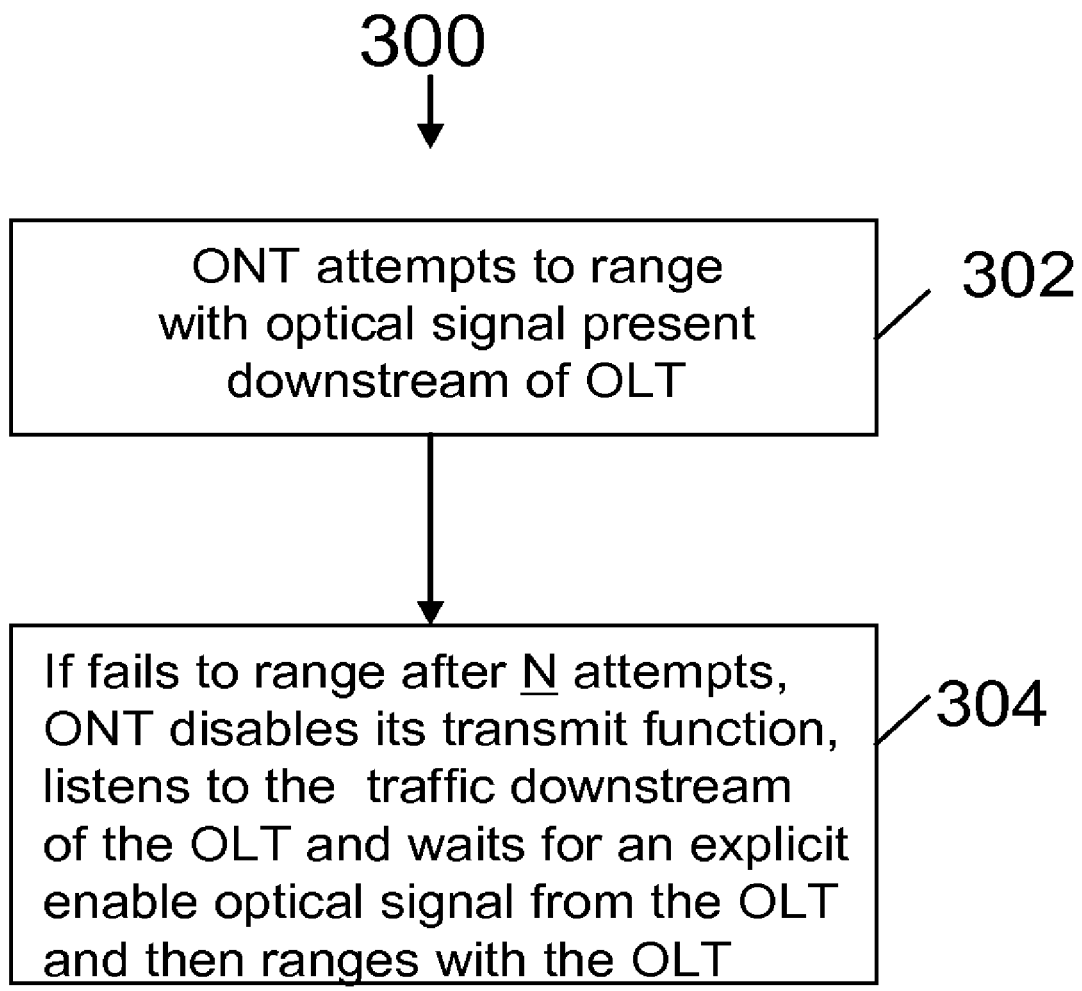
FIG. 3 illustrates an ONT auto disable function according to an embodiment of the present invention.

Now referring to FIG. 3, a flowchart 300 depicts the steps involved with an ONT establishing a transmission. The flowchart 300 begins at step 302, when the ONT has no signal and is attempting to range with an optical signal present downstream of the OLT. The ONT, utilizing the software of the present invention, has been programmed to make N ranging attempts (up to a maximum number of attempts or maximum amount of time) to range with the OLT. This ensures that the ONT should not become disruptive to the operation of the optical system which supports the operation of the other ONTs being serviced upstream by the OLT. If the ONT fails to range after expiration of N attempts, it transitions to step 304 and disables its transmit function. At this step the ONT listens to the downstream traffic signal and sends an OMCI message to revoke the explicit enable and on receiving the handshake from the OLT, the ONT establishes the transmission with the optical signal present downstream of the OLT.

Figure 4:
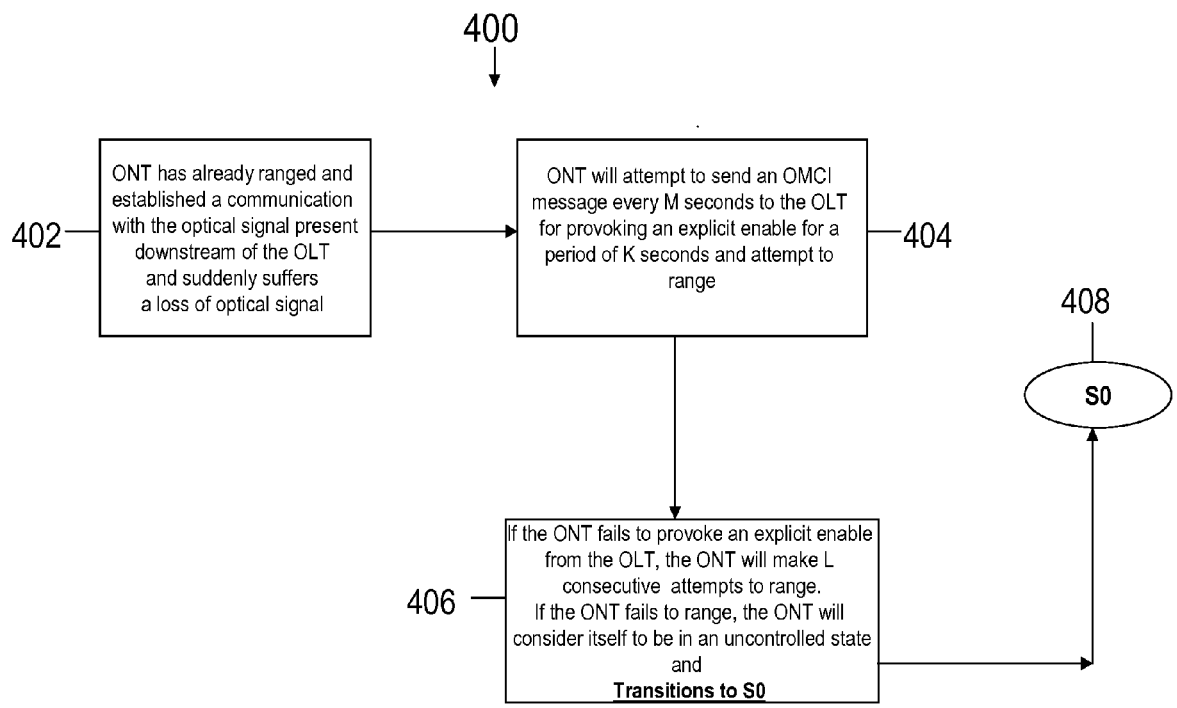
FIG. 4 illustrates an ONT handshake function according to an embodiment of the present invention.

Now referring to FIG. 4, a flowchart 400 depicts the process for establishing a handshake with the OLT, when an ONT suffers a loss of service. At step 402, an ONT has already ranged with the OLT and suddenly suffers a loss of communication with the OLT. At step 404, the ONT will send an OMCI message periodically every M seconds for period of K seconds to initiate a handshake with the OLT. If it fails to provoke an explicit enable with the optical signal present downstream of the OLT, it will be considered a response failure and will transition to step 406. At the step 406, the ONT will attempt to range with the OLT. After L consecutive response failures by the ONT have occurred, the ONT will consider itself to be in an uncontrolled state and will transition to state S0 and would restart the process as described in FIG. 2, above. Such an event can be termed a handshake failure.

Figure 5:
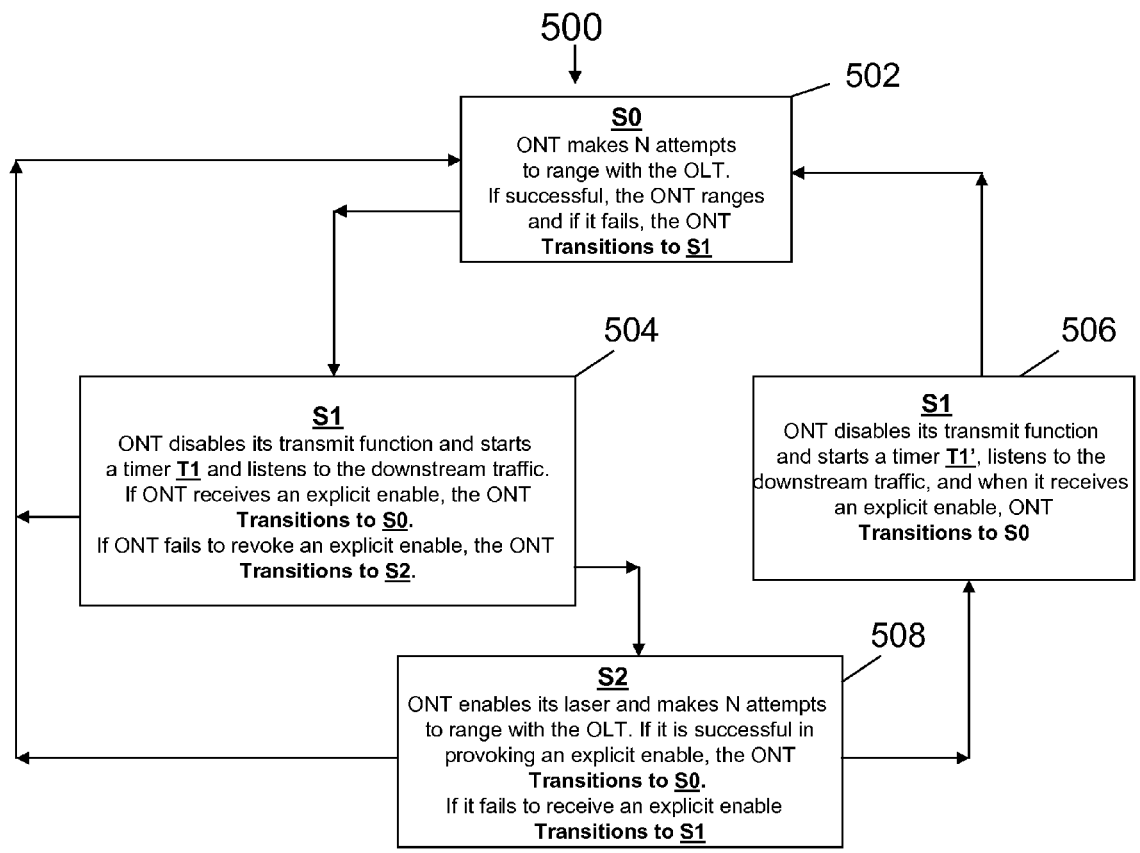
FIG. 5 illustrates a system according to an embodiment of the present invention.

Now referring to FIG. 5, a flowchart 500 depicts steps that occur at each stage of the invention. At step 502, which is state S0, the ONT is attempting to range with the optical signal present downstream of the OLT. If successful, the ONT ranges. If it fails to range with the OLT in N attempts, the ONT transitions to state S1 at step 504. While the ONT is in state S1, it disables its transmit function and starts a timer T1. The initial value of T1 is random in the range of around 60 seconds to around 90 seconds. While still at step 504, the ONT listens to the optical traffic downstream of the OLT and if it receives an explicit enable from the OLT, it transitions to state S0, turns on its laser and initiates the handshake with the OLT. The system is then restarted. If the ONT fails to revoke the explicit enable with the OLT in the duration of time T1, it transitions to state S2 at step 508. At step 508, the ONT turns on its laser and attempts to range with the optical signal present downstream of the OLT. If successful, it transitions to stage S0 at step 502 and initiates the handshake with the OLT. The system is then restated. If it is unsuccessful after N ranging windows, the ONT reenters state S1 at step 506, disables its transmit function and starts a timer T1'. The value of timer T1' is approximately double of the value of timer T1, where the value of the timer T1' is increased by a random quantity in the range of around 0 to around 20 seconds to a maximum of 3600 seconds. In other embodiments, the value of the timer T1' can be less than or greater than double the value of the timer T1, the range can be increased by greater than 20 seconds, and the maximum can be greater than 3600 seconds without departing from the scope of the present invention. At step 506, the ONT listens to the optical traffic downstream of the OLT and when it receives an explicit enable from the OLT, it transitions to state S0, turns on its laser and initiates the handshake. The system is then restarted.

In one embodiment of the present invention, a computer readable medium comprises instructions for: entering a first state if an optical signal is present and if a ranging process cannot occur: monitoring downstream traffic, disabling a transmit function, starting a first timer, and entering a second state if the first timer expires. The computer readable medium further comprises instructions for: enabling the transmit function and attempting the ranging process after entering the second state, if the ranging process in the second state cannot occur, starting a second timer, if the second timer expires, re-entering the first state, disabling the transmit function, for increasing the value of the first timer, adding a random quantity to the increased value of the first timer, wherein the ranging process adjusts timing for an Optical Network Terminal, and entering the first state if the optical signal is present downstream of an Optical Network Terminal.

In another embodiment of the present invention, a method for disabling an Optical Network Terminal (ONT), comprises sending a message from the ONT to an Optical Line Terminal (OLT), if the ONT does not receive an expected OLT action or an expected OLT response to the message within a period, considering the non-receipt of the expected OLT action or the expected OLT response a failure, and if a certain number of consecutive failures have occurred, considering by the ONT that it has entered an uncontrolled state. The method further comprises entering a first state if the ONT has entered the uncontrolled state, monitoring downstream traffic by the ONT, disabling a transmit function by the ONT, and starting a first timer by the ONT, entering a second state if the first timer expires, enabling the transmit function and attempting a ranging process after entering the second state, if the ranging process cannot occur, starting a second timer and determining if the ONT receives the expected OLT action or the expected OLT response, if the second timer expires before the ONT receives the expected OLT action or the expected OLT response, re-entering the first state, disabling the transmit function and increasing the value of the first timer, wherein the message is sent periodically, and wherein the message is an ONT management and control interface message.

Although exemplary embodiments of the system, method and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the modules or software states described herein. Also, these capabilities may be performed in the current manner or in a distributed manner and on, or via, any device able to provide and/or receive information. Further, although depicted in a particular manner, various modules may be repositioned without departing from the scope of the current invention. Still further, although depicted in a particular manner, a greater or lesser number of modules, connections, computer readable media, software states, and the like can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A non-transitory computer readable storage medium comprising instructions that when executed causes a processor to perform:
    sending a message from an Optical Network Terminal (ONT) to an Optical Line Terminal (OLT);
    if the ONT does not receive an expected OLT action or an expected OLT response to the message within a period, considering the non-receipt of the expected OLT action or the expected OLT response a failure;
    if a certain number of consecutive failures have occurred, considering by the ONT that it has entered an uncontrolled state;
    transitioning from an initial state to a first state if an optical signal is present and if a ranging process cannot occur;
    monitoring downstream traffic;
    disabling a transmit function;
    starting a first timer, wherein the disabling and starting operations are performed while operating in the first state;
    entering a second state different from the first state if the first timer expires; and
    invoking a ranging process while operating in the second state to range the optical signal.

2. The non-transitory computer readable storage medium of claim 1 comprising instructions for enabling the transmit function and attempting the ranging process after entering the second state.

3. The non-transitory computer readable storage medium of claim 2 comprising instructions for, if the ranging process in the second state cannot occur, starting a second timer.

4. The non-transitory computer readable storage medium of claim 3 comprising instructions for, if the second timer expires, re-entering the first state.

5. The non-transitory computer readable storage medium of claim 4 comprising instructions for disabling the transmit function.

6. The non-transitory computer readable storage medium of claim 5 comprising instructions for increasing the value of the first timer.

7. The non-transitory computer readable storage medium of claim 6 comprising instructions for adding a random quantity to the increased value of the first timer.

8. The non-transitory computer readable storage medium of claim 1, wherein the ranging process adjusts timing for an Optical Network Terminal.

9. The non-transitory computer readable storage medium of claim 1 comprising instructions for entering the first state if the optical signal is present downstream of an Optical Line Terminal (OLT).

10. A method for disabling an Optical Network Terminal (ONT), comprising:
    sending a message from the ONT to an Optical Line Terminal (OLT);
    if the ONT does not receive an expected OLT action or an expected OLT response to the message within a period, considering the non-receipt of the expected OLT action or the expected OLT response a failure;
    if a certain number of consecutive failures have occurred, considering by the ONT that it has entered an uncontrolled state;
    transitioning from an initial state to a first state if the ONT has entered the uncontrolled state and if an optical signal is present and a ranging process cannot occur;
    monitoring downstream traffic by the ONT;
    disabling a transmit function by the ONT;
    starting a first timer by the ONT, wherein the disabling and starting operations are performed while operating in the first state;
    entering a second state different from the first state if the first timer expires; and
    invoking a ranging process while operating in the second state to range the optical signal.

11. The method of claim 10 comprising enabling the transmit function and attempting a ranging process after entering the second state.

12. The method of claim 11 comprising, if the ranging process cannot occur, starting a second timer and determining if the ONT receives the expected OLT action or the expected OLT response.

13. The method of claim 12 comprising, if the second timer expires before the ONT receives the expected OLT action or the expected OLT response, re-entering the first state.

14. The method of claim 13 comprising disabling the transmit function and increasing the value of the first timer.

15. The method of claim 10, wherein the message is sent periodically.

16. The method of claim 10, wherein the message is an ONT management and control interface message.

17. A system for disabling an Optical Network Terminal (ONT), comprising:
    at least one ONT; and
    an Optical Line Terminal (OLT) that receives a message from the ONT;
    wherein, if the ONT does not receive an expected OLT action or an expected OLT response to the message within a period, the non-receipt of the expected OLT action or the expected OLT response is considered a failure, wherein if a certain number of consecutive failures have occurred, the ONT considers itself to have entered an uncontrolled state; and
    wherein if the ONT has entered the uncontrolled state and if an optical signal is present and a ranging process cannot occur, then the ONT is further configured to transition from an initial state to a first state, monitor downstream traffic, disable a transmit function of the ONT, start a first timer, wherein the disable and start operations are performed while operating in the first state, and wherein the ONT is further configured to enter a second state different from the first state if the first timer expires, and invoke a ranging process while operating in the second state to range the optical signal.

* * * * *